United States Patent
Tetzlaff et al.

(10) Patent No.: US 8,991,832 B2
(45) Date of Patent: Mar. 31, 2015

(54) DOUBLE-ACTING SUSPENSION AXLE ASSEMBLY FOR HEAVY LOAD TRANSPORTERS

(75) Inventors: David M. Tetzlaff, Wausau, WI (US);
John R. Burnett, Cedar Falls, IA (US);
Jason Van Clark, Waterloo, IA (US);
Melvin D. Terry, Mount Vernon, WA (US)

(73) Assignees: Doefer Companies, Waverly, IA (US);
Clover Industries Inc., Wausau, WI (US)

( * ) Notice: Subject to any disclaimer, the term of this patent is extended or adjusted under 35 U.S.C. 154(b) by 0 days.

(21) Appl. No.: 13/469,508

(22) Filed: May 11, 2012

(65) Prior Publication Data

US 2013/0302122 A1 Nov. 14, 2013

(51) Int. Cl.
*B60G 17/00* (2006.01)
*B60G 3/01* (2006.01)
*B60G 17/04* (2006.01)

(52) U.S. Cl.
CPC ........ *B60G 3/01* (2013.01); *B60G 17/04* (2013.01);
*B60G 2300/36* (2013.01); *B60G 2300/37* (2013.01); *B60G 2400/204* (2013.01); *B60G 2400/252* (2013.01); *B60G 2400/30* (2013.01); *B60G 2400/41* (2013.01)
USPC .................. 280/6.151; 280/6.155; 280/5.514; 280/6.159; 280/124.157; 180/65.1; 180/24.02; 180/22; 414/498

(58) Field of Classification Search
USPC ...................... 280/6.151, 6.155, 5.514, 6.159, 280/124.157; 180/65.1, 24.02, 22; 414/498
See application file for complete search history.

(56) References Cited

U.S. PATENT DOCUMENTS

| | | | | |
|---|---|---|---|---|
| 4,836,578 A * | 6/1989 | Soltis | ........................ | 280/6.15 |
| 5,087,072 A * | 2/1992 | Kawarasaki | ............... | 280/5.503 |
| 5,371,598 A * | 12/1994 | Ghaem et al. | ................. | 356/617 |
| 5,755,382 A * | 5/1998 | Skotinkov | ..................... | 239/161 |
| 5,865,453 A * | 2/1999 | Harada et al. | .......... | 280/124.161 |
| 6,024,184 A * | 2/2000 | Kalkman et al. | ............. | 180/14.1 |
| 6,371,505 B1 * | 4/2002 | Turner, II | ................... | 280/441.2 |
| 6,942,232 B1 * | 9/2005 | McGhie | ................ | 280/124.112 |
| 7,311,314 B2 * | 12/2007 | Kasamatsu | ............... | 280/5.501 |
| 7,562,887 B1 * | 7/2009 | Sutton et al. | ........... | 280/124.112 |
| 7,913,822 B2 * | 3/2011 | Haney et al. | ................. | 188/284 |
| 7,957,865 B2 * | 6/2011 | Brookes et al. | ................ | 701/37 |
| 8,113,592 B2 * | 2/2012 | Busley et al. | ................ | 299/39.6 |
| 8,678,408 B2 * | 3/2014 | Kobayashi et al. | .... | 280/124.117 |
| 2005/0029064 A1 * | 2/2005 | Gaile | ....................... | 188/322.21 |

(Continued)

FOREIGN PATENT DOCUMENTS

JP 11-246198 * 9/1999

*Primary Examiner* — Joseph Rocca
*Assistant Examiner* — Marlon Arce
(74) *Attorney, Agent, or Firm* — Polsinelli PC

(57) ABSTRACT

The present disclosure relates to double acting suspension axle assemblies that can be used to facilitate mobility of a heavy load transporter and/or to adjust a deck height of the heavy load transporter. Each axle assembly includes a wheel assembly and a double-acting hydraulic cylinder. The double acting suspension axle provides the ability to force the hydraulic cylinder of each axle assembly to fully retract without relying solely on gravity. The double acting suspension axle assembly may be incorporated directly into or permanently affixed to other large structures, such as mobile robots, large tooling structures, gantry cranes, or other large machinery to provide the precise control of mobility and forced lowering capabilities.

10 Claims, 14 Drawing Sheets

(56) References Cited

U.S. PATENT DOCUMENTS

| | | | |
|---|---|---|---|
| 2005/0077691 A1* | 4/2005 | Witters | 280/5.514 |
| 2005/0206250 A1* | 9/2005 | Steffen et al. | 310/59 |
| 2008/0315666 A1* | 12/2008 | Von Schonebeck et al. | 299/39.6 |
| 2009/0273159 A1* | 11/2009 | Sutton | 280/419 |
| 2010/0117320 A1* | 5/2010 | Grozev et al. | 280/124.16 |
| 2011/0298188 A1* | 12/2011 | Haubrich et al. | 280/6.155 |

* cited by examiner

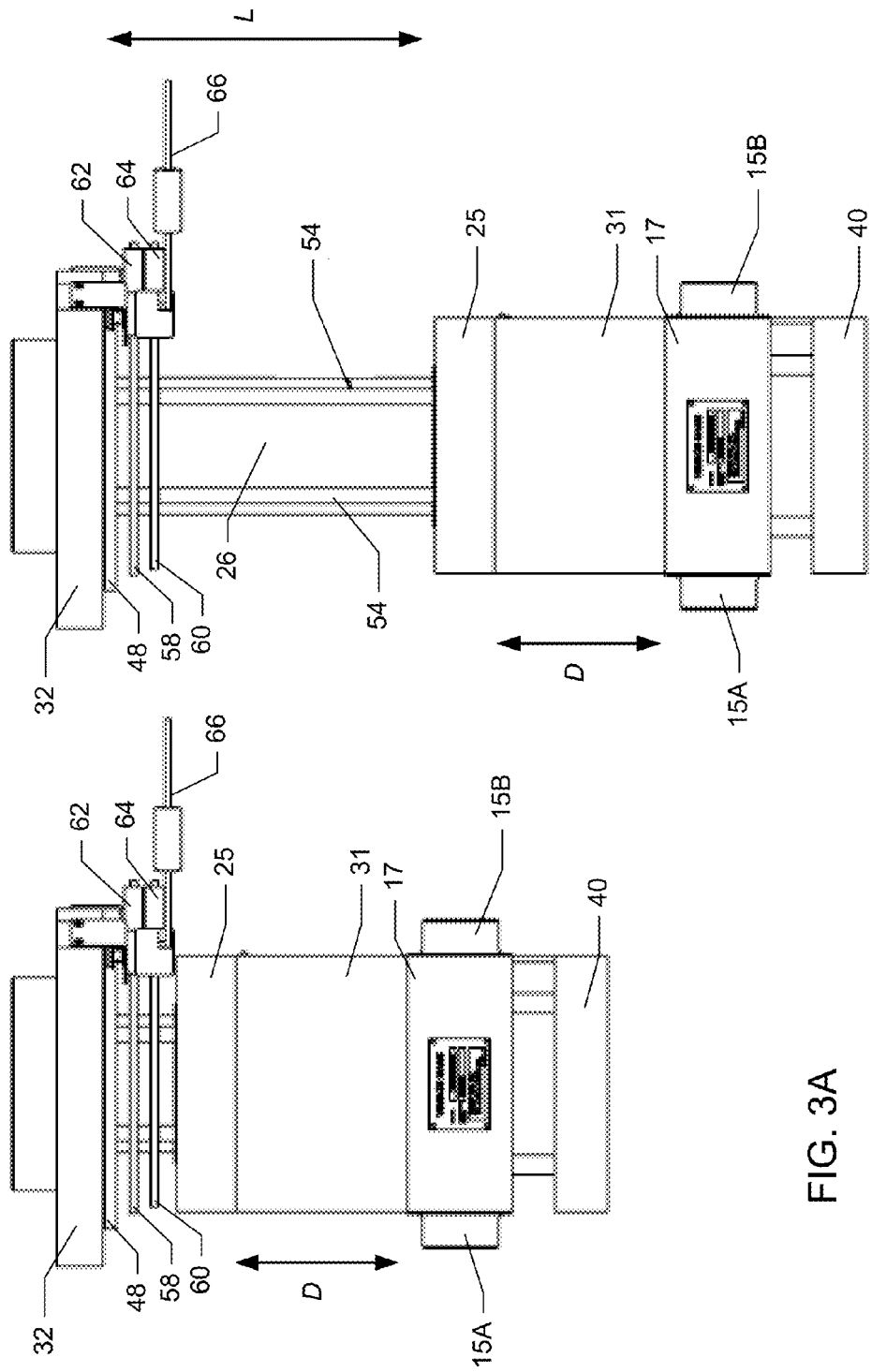

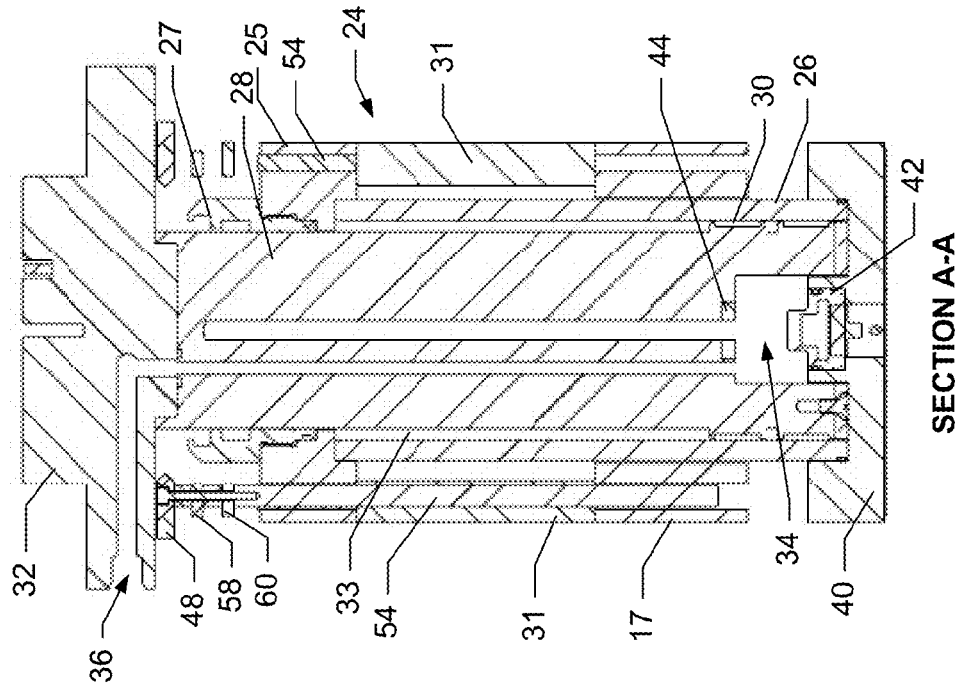
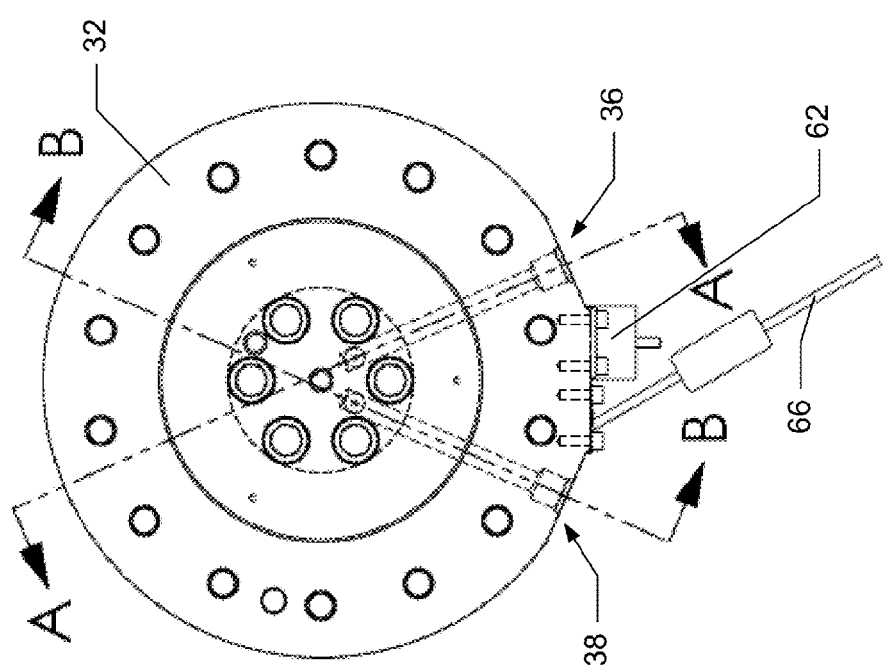
SECTION A-A
FIG. 7
FIG. 6

SECTION C-C

SECTION B-B

SECTION D-D

DOUBLE-ACTING SUSPENSION AXLE ASSEMBLY FOR HEAVY LOAD TRANSPORTERS

CROSS REFERENCE TO RELATED APPLICATIONS

Not Applicable.

FIELD OF THE INVENTION

The present disclosure generally relates to a double-acting suspension axle assembly for heavy material lifting equipment. The double-acting suspension axle assembly may be used in conjunction with a control system to position and control the deck height of a heavy load transporter before, during, and after engaging a load. In particular, the double-acting suspension axle assembly may be used to forcibly lower the deck of the transporter before or after engaging a load.

BACKGROUND INFORMATION

Multi axle, self-loading heavy load transporters may experience problems with getting the deck of the transporter to lower uniformly when disengaging from under a load platform. Typically, the transporter is lowered to drive under stand-supported loads. The vertical entry clearance is minimal and the leading edge of the transporter must be as low as possible. Often, the unloaded weight of the transporter's load deck is only marginally sufficient to overcome cylinder resistance (e.g. the fluid resistance from the hydraulic fluid within the cylinder and the friction between moving components of the cylinder including the piston rod) and the resistance of the hydraulic fluid as it flows back to the reservoir. For example, the end(s) of the transporter load deck that are the farthest from the hydraulic fluid reservoir may experience increased resistance when lowering under gravity due to the fluid resistance of the lengthy hydraulic fluid lines. In a best case scenario, the resistance causes the load deck to be slow reacting, while in the worst case scenario, the transporter deck does not fully lower and cannot be positioned beneath a load. One proposed solution to cause the load deck to lower evenly requires the use weights and counterweights placed on the load deck; however, this has proven largely impractical.

There exists a need for a highly maneuverable transporter capable of efficiently hydraulically raising and lowering the transporter load deck during self-loading operations. In addition, there exists a need for an axle assembly where the rotation of the axle assembly can be monitored when one or more axle hydraulic cylinders are in any portion of stroke in any portion of extended and retracted orientation.

SUMMARY OF THE INVENTION

The present application relates to and discloses an axle assembly and a heavy load transporter incorporating one or more of the axle assemblies. In one embodiment, an axle assembly includes a wheel assembly, a double-acting hydraulic cylinder assembly, a height sensor to measure an extension of the hydraulic cylinder assembly, and a steering sensor to measure an angular rotation of the wheel assembly.

In another aspect, an axle assembly includes a double-acting hydraulic cylinder assembly having a double acting hydraulic cylinder. The axle assembly also includes at least two independently powered wheels engaged to the double-acting hydraulic cylinder assembly, at least one height sensor to measure an extension height of the double acting hydraulic cylinder, and at least one steering sensor to measure a rotation angle of the double acting hydraulic cylinder.

In yet another embodiment, an axle assembly for a transporter includes a double-acting hydraulic cylinder assembly having a cylinder housing that defines at least one trunnion peg and an opening to receive a cylinder barrel. The cylinder barrel contains a piston seal to divide the cylinder barrel into an upper chamber and a lower chamber, wherein the piston seal is engaged to a piston rod within the upper chamber. The piston rod is further engaged to a flange configured to engage a deck of the transporter.

The axle assembly also includes a wheel assembly that has a frame to engage at least one trunnion peg for lateral equalized loading, a first wheel, a second wheel, a first drive motor operatively engaged to the first wheel, and a second drive motor operatively engaged to the second wheel. The wheel assembly is configured to rotate about a central longitudinal axis of the cylinder barrel, wherein the first motor operates independently of the second motor to rotate the wheel assembly though a differential steering arrangement. In one aspect, the drive motors are electric drive motors.

The axle assembly includes a steering sensor to measure the rotation and position of the wheel assembly. The steering sensor is rigidly engaged to the flange and mechanically engaged to an annular steering gear rigidly affixed to at least one elongated pin received in the cylinder housing. The steering gear encircles the cylinder rod and is rotatable about the central longitudinal axis of the cylinder barrel.

The axle assembly also includes at least one cam plate rigidly affixed to at least one elongated pin. The at least one cam plate has a profile to engage at least one wheel assembly rotation limit switch. The axle assembly also includes a height sensor affixed to a bottom of the cylinder housing. The height sensor is in communication with the cylinder barrel to measure an extension and a retraction of the piston rod.

The height sensor is in communication with a piston seal of the double-acting hydraulic cylinder assembly. In various other aspects, the steering sensor measures the angular rotation of the wheel assembly when the hydraulic cylinder assembly is in an extended orientation.

In one aspect, the wheel assembly that rotates about a central axis of the double-acting hydraulic cylinder assembly is preferably restrained to 220 degrees, while in another aspect the wheel assembly rotates about a central axis of the double-acting hydraulic cylinder assembly to accommodate a typical steering rotation of 150 degrees. In various aspects, the double-acting hydraulic cylinder assembly has a lift stroke preferably configured to provide up to twelve inches or more of vertical lift.

In another aspect, the angularity of each wheel assembly relation to the transporters centerlines geometry may be precisely monitored, in addition to monitoring the load pressure on each hydraulic cylinder assembly or load zones or groups of cylinders. By monitoring the pressure, the extension and retraction of each hydraulic cylinder assembly may be monitored during the engagement and release of load pressure.

While multiple embodiments are disclosed, still other embodiments of the present invention will become apparent to those skilled in the art from the following detailed description, which shows and describes illustrative embodiments of the invention. As will be realized, the invention is capable of modifications in various aspects, all without departing from the spirit and scope of the present invention. Accordingly, the drawings and detailed description are to be regarded as illustrative in nature and not restrictive.

One transporter configuration that may incorporate the double-acting hydraulic cylinder assembly includes, but is not limited to, a "headed" transporter where the engine/generator and related machinery are located above one end the load deck. The fluid reservoir for equalizing the suspension of headed transporters is normally located with the machinery at the end of the deck. Another transporter configuration that may incorporate the double-acting hydraulic cylinder assembly is a "headless" transporter, where the engine/generator and related machinery are located below the lifting surface of the load deck. In headless transporters, the machinery and fluid reservoir are typically located at or near the center of the transporter. The headless configuration allows the transporter to enter or exit in any direction to or from under stand-supported or suspended loads. In contrast, the headed transporter is limited in the manner by which it can engage a load.

The double acting cylinder axle assemblies may also be incorporated into a variety of other applications, where it is desirable to forcibly overcome fluid resistance in draining hydraulic fluid. For example, the axle assemblies may be built directly into or permanently affixed into the bases of large structures, such as mobile robots, large tooling structures, gantry cranes, or other large machinery to provide the precise control mobility and forced lowering capabilities. In these other applications, it may also be desirable that the axle assembly lower totally across all support points to assure that there is zero loading pressure on any wheel assembly. This functionality is desirably where loads are being lowered and located onto precision alignment cones, or similar, landing points.

BRIEF DESCRIPTION OF FIGURES

FIG. 3A is a side elevation view of a double-acting suspension axle assembly in a retracted orientation.

FIG. 3B is a side elevation view of a double-acting suspension axle assembly in an extended orientation.

FIG. 6 is a plan view of a double-acting hydraulic cylinder assembly the double-acting hydraulic cylinder assembly of FIG. 5.

FIG. 7 is a cross-section view of the double-acting hydraulic cylinder assembly of FIG. 6 viewed along line A-A.

DETAILED DESCRIPTION OF THE INVENTION

The present disclosure relates to a double-acting suspension axle assembly and a transporter incorporating the double-acting suspension axle assemblies. In particular, the transporter and axle assemblies may be used for forcibly overcoming fluid resistance to fully lower a transporter deck. The axle assembly may also be used in a number of heavy-load applications. The axle assemblies of the present disclosure provide the ability to force the hydraulic cylinder of each axle assembly to fully retract without relying solely on gravity. In one aspect, the hydraulic cylinder includes a cylindrical and rotatable piston rod and a number of elongated pins that are coupled with an arrangement of gears, cams, and pinions. The cylindrical piston rod, pins and gear arrangement eliminates the need for a piston rod that uses a keyway, spline, and/or flattened sides to limit rotation of an affixed ring to which height and/or rotation sensors are operatively engaged.

According to other aspects, a transporter is configured with multiple double-acting suspension axle assemblies that are each selectively monitored and controlled by a control system to monitor a lifting height and a lowered height of one or more axle assemblies of the transporter. By monitoring and selectively controlling the one or more axle assemblies, the lifting height and fully lowered height of the transporter can be controlled and adjusted.

Although described in relation to heavy-load transporters, the double acting cylinder axle assemblies may also be incorporated into a variety of other applications, where it is desirable to forcibly overcome fluid resistance in draining hydraulic. For example, the axle assemblies may be built directly into or permanently affixed into the bases of large structures, such as mobile robots, large tooling structures, gantry cranes, or other large machinery to provide the precise control mobility and forced lowering capabilities. In these other applications, it may also be desirable that the axle assembly lower totally across all support points to assure that there is zero loading pressure on any wheel assembly. This functionality is desirably where loads are being lowered and located onto precision alignment cones, or similar, landing points. Similarly, the double-acting axle assemblies may be desired to assure that there are no conflicting forces being applied by the axle assemblies.

Figure 1:
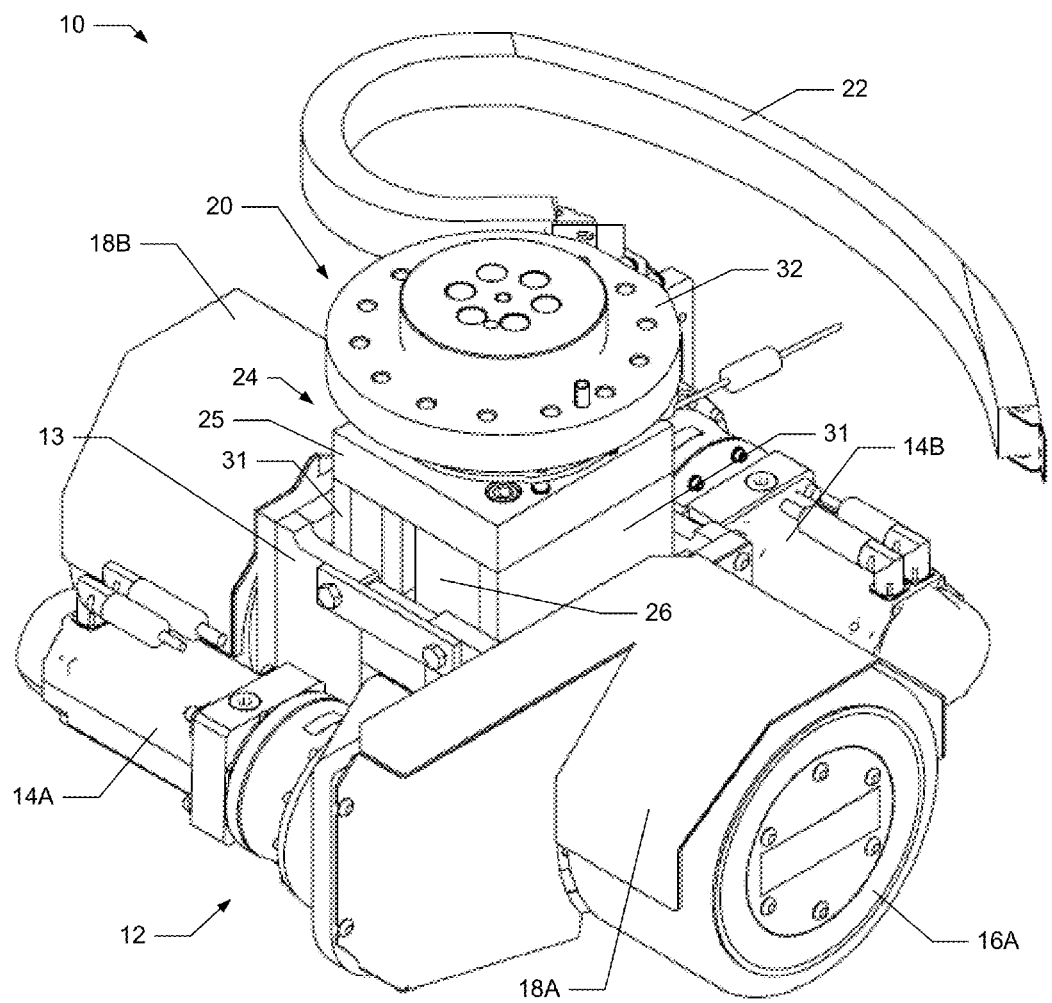
FIG. 1 is a perspective view of a double-acting suspension axle assembly.

FIG. 1 is a perspective view of a double-acting suspension axle assembly 10. Typically, each axle assembly 10 is constructed to support weights ranging from near zero to 50,000 lbs or greater, depending on the wheel and hydraulic cylinder sizes employed; however, the axle assembly 10 may be constructed to support other weight ranges or load ratings. For example, A transporter having the axle assemblies 10 may be rated to transport 145 tons or more.

In one embodiment, the axle assembly 10 includes one or more wheels or wheel assemblies 12 that are engaged to a hydraulic cylinder assembly 20. The axle assembly 10 may also includes a flexible cable conduit arm 22, through which electrical wires, cables, or fluid lines may be housed to provide electrical and/or hydraulic communication to and from the axle assembly.

Figure 2A:
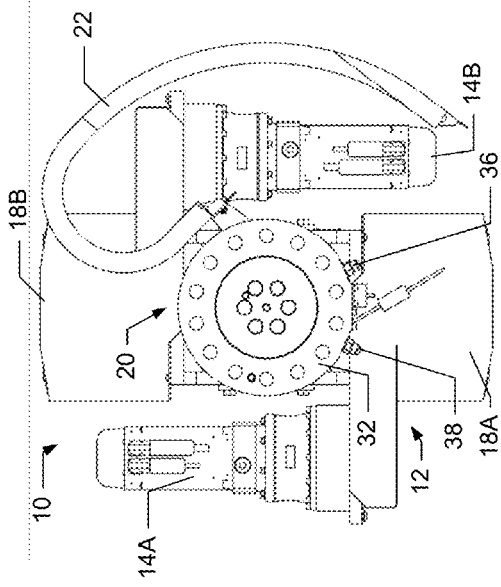
FIG. 2A is a plan view of a double-acting suspension axle assembly.
Figure 2B:
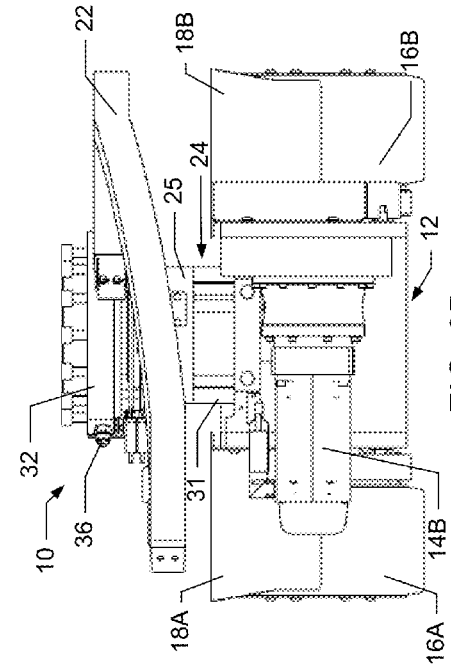
FIG. 2B is a side elevation view of a double-acting suspension axle assembly.
Figure 2C:
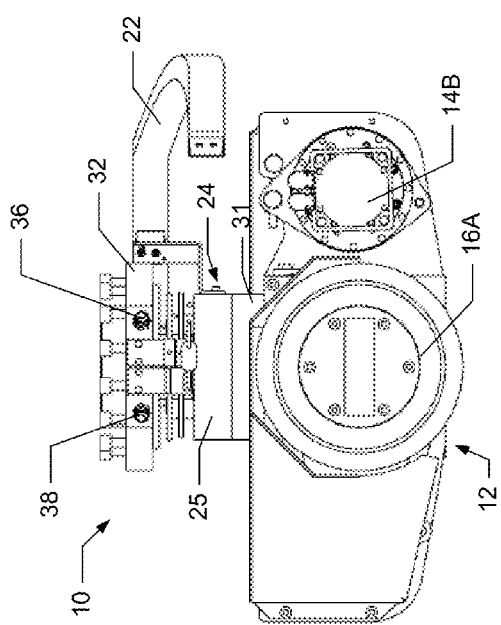
FIG. 2C is an end elevation view of a double-acting suspension axle assembly.

The wheel assembly 12 includes a frame 13 and one or more motors 14A and 14B that drive wheels 16A and 16B, respectively, as shown in FIGS. 2A-2C. In one embodiment, the motors 14A and 14B are electric drive motors that drive respective wheels 16A and 16B independently of one another. By way of example and not limitation, the motors 14A and 14B may be precision servomotors that are paired with one or more encoders. The motors 14A and 14B may directly engage each respective wheel 16A and 16B or the motors may be engaged to the wheels through any suitable drive arrangement, including but not limited to belt drives, chain drives, geared drives, or combinations thereof. In other embodiments, the motors 14A and 14B may be any other motor, including hydraulic motors, suitable for driving the wheels 16A and 16B under heavy loads.

In other embodiments, any other tire, pneumatic or solid wheel suitable for transporting heavy objects may be used. By way of example and not limitation, wheels may be composed of solid urethane or a similar material. As shown, the wheels 16A and 16B may be covered by protective wheel covers 18A-18B. The wheel covers 18A and 18B, may also serve to protect and shield at least a portion of the drive arrangement between the motors 14A and 14B and the wheels 16A and 16B.

Figure 4B:
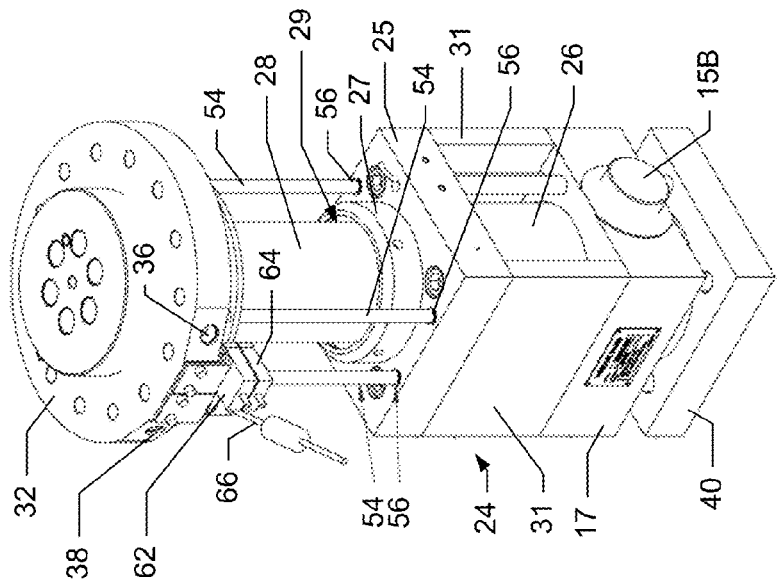
FIG. 4B is a perspective view of a double-acting suspension axle assembly in an extended orientation.
Figure 4A:
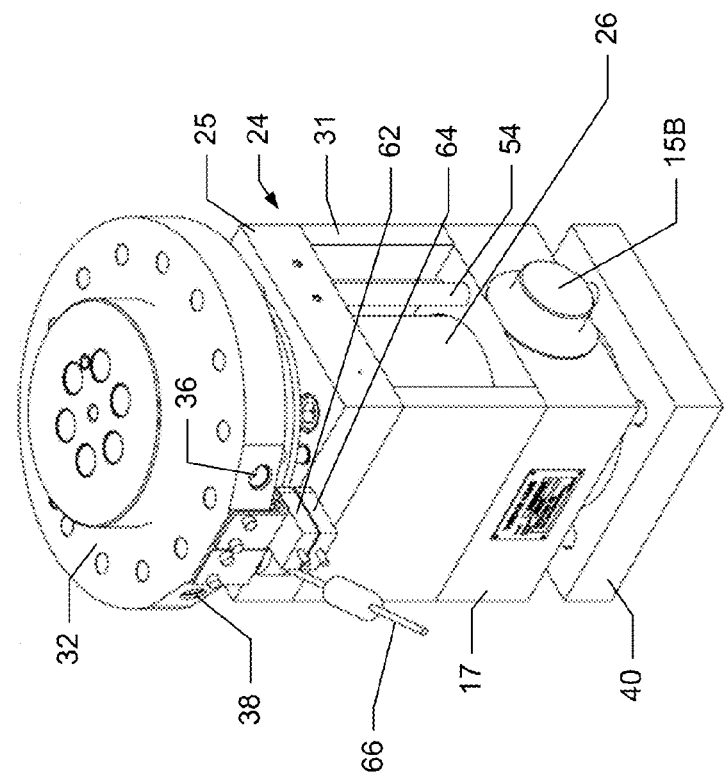
FIG. 4A is a perspective view of a double-acting suspension axle assembly in a refracted orientation.
Figure 5:
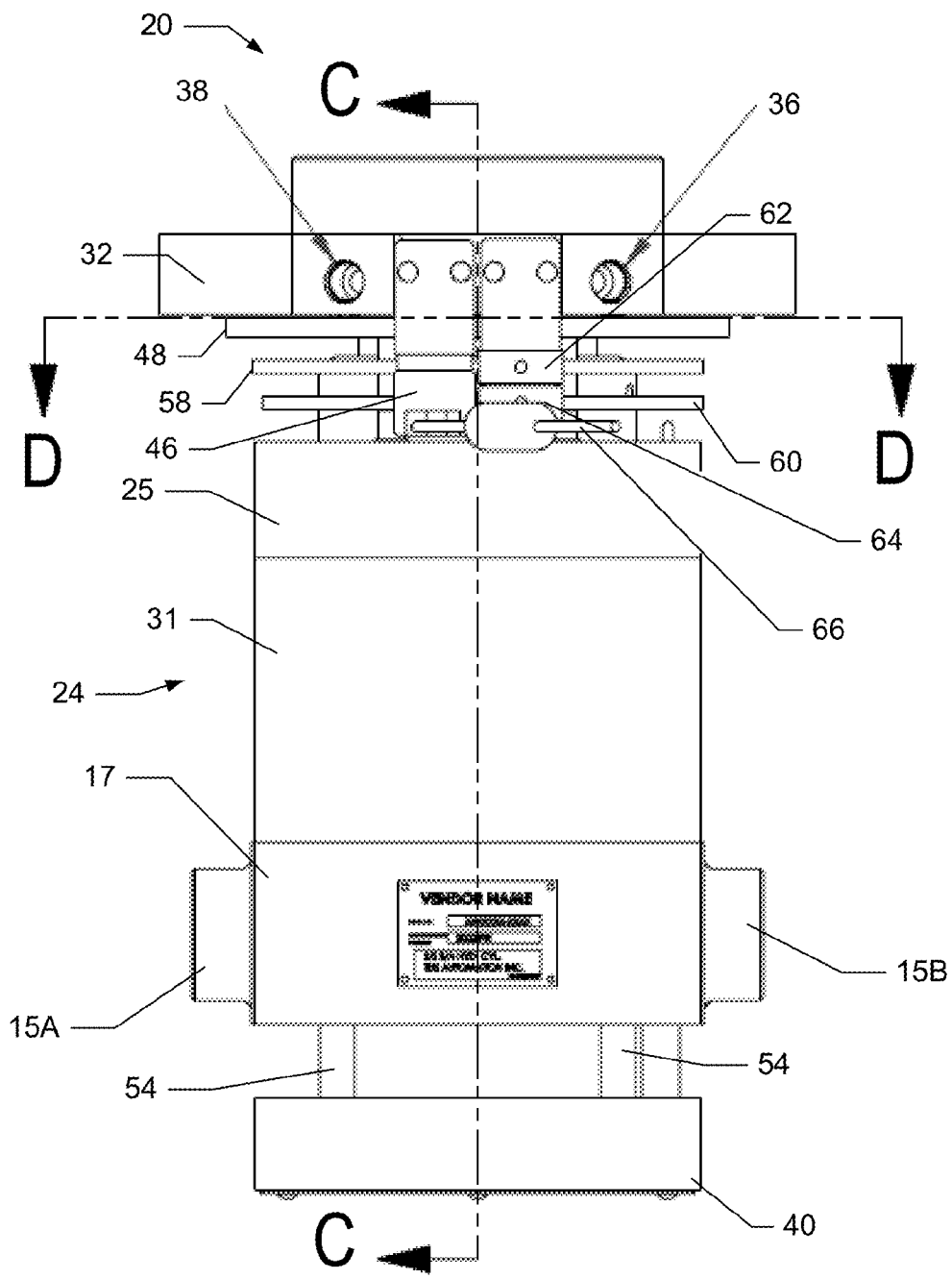
FIG. 5 is an elevation view of a double-acting hydraulic cylinder assembly.
Figures 11A, 11B:
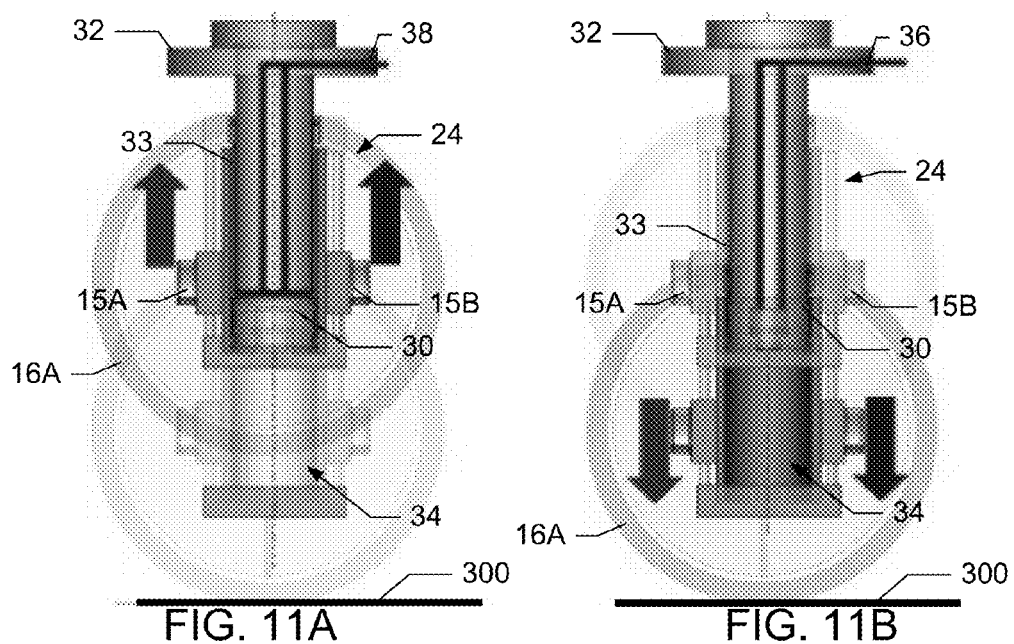
FIG. 11A is a half-section elevation of the double-acting suspension axle assembly in a retracted orientation, wherein the double-acting hydraulic cylinder assembly is shown in partial cross section.
FIG. 11B is a half-section elevation of the double-acting suspension axle assembly in an extended orientation, wherein the double-acting hydraulic cylinder assembly is shown in partial cross section.

In one embodiment, the wheel assembly 12 is engaged to the cylinder assembly 20 through a trunnion mount configuration that permits the wheel assembly 12 to tilt laterally. In particular, trunnion pegs 15 (e.g., 15A and 15B) that extend from a trunnion yoke 17, as shown in FIGS. 3A, 3B, 4A, 4B, and 5, partially rest upon the frame 13. The trunnion yoke 17 is slidably engaged to a barrel 26 of the cylinder assembly 20, as shown in FIGS. 4A and 4B. The trunnion yoke 17 allows the wheel assembly 12 to articulate laterally (e.g. +/−4 degrees) to comply with an undulating operating surface 300 or terrain, as shown in FIGS. 11A and 11B.

As shown in FIG. 3B, the hydraulic cylinder assembly 20 includes a uniquely functioning double-acting hydraulic cylinder having a variable stroke L. In one aspect, the hydraulic cylinder assembly 20 has a hollow cylinder barrel 26 that receives a cylindrical and rotatable piston rod 28. The bottom of the cylinder barrel 26 is affixed to and sealed by a base cap 40, while the top of the cylinder barrel 26 is affixed to and sealed by a top plate 25 as shown in FIG. 4B. The top plate 25 further includes a rod bushing 27 that defines an opening 29 to receive the piston rod 28. The base cap 40, the top plate 25, and the rod bushing 27 fluidly seal the cylinder barrel 26 to prevent the unintentional loss of hydraulic fluid and pressure with in the interior of the barrel 26.

In one aspect, the stroke length L of the hydraulic cylinder assembly 20 is partially defined by the distance D between the slidable trunnion yoke 17 and the top plate 25 as shown in FIG. 3B. The distance D is further defined by the one or more spacer blocks 31 placed between the top plate 25 and the trunnion yoke 17. The height of the spacer blocks 31 defines the distance D, and D may vary depending upon the lifting application. For example, longer spacer blocks 31 are required when a greater stroke length L is desired. However, the stroke length L can be limited by selecting spacer blocks with greater heights to increase the distance between the top of the piston rod 28 and the trunnion yoke 17.

The stroke length L can be configured for each loading and transporting application. For example, the spacer blocks 31 having the desired height are selected and affixed to both the top plate 25 and the trunnion yoke 17 to prevent movement of the trunnion yoke along the vertical axis of the hydraulic cylinder assembly 20. When installed, the spacer blocks 31, in combination with the base cap 40, trunnion yoke 17, and top plate 25, collectively form a cylinder housing 24, such as shown in FIG. 1.

Referring now to FIGS. 6-9, the piston rod 28 includes a piston seal 30 that is engaged to the lower end of the piston rod, while the upper end of the piston rod is engaged to a flange 32. The flange 32 is configured for engaging a load deck 102 of a transporter 110, as shown in FIGS. 13-17.

Figure 9:
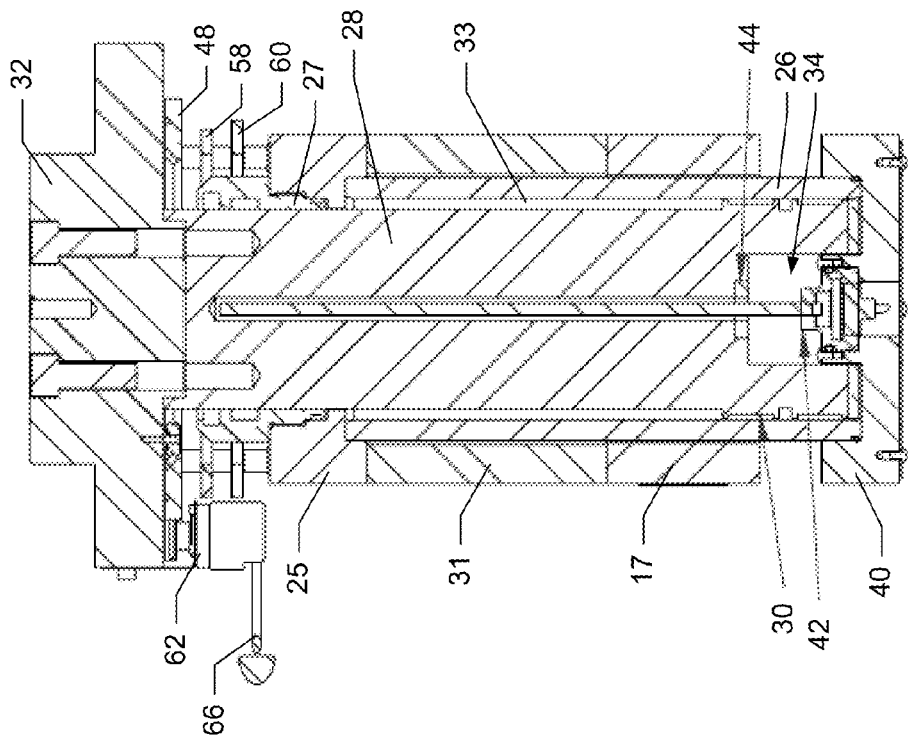
FIG. 9 is a cross-section view of the double-acting hydraulic cylinder assembly of FIG. 5 viewed along line C-C.
Figure 8:
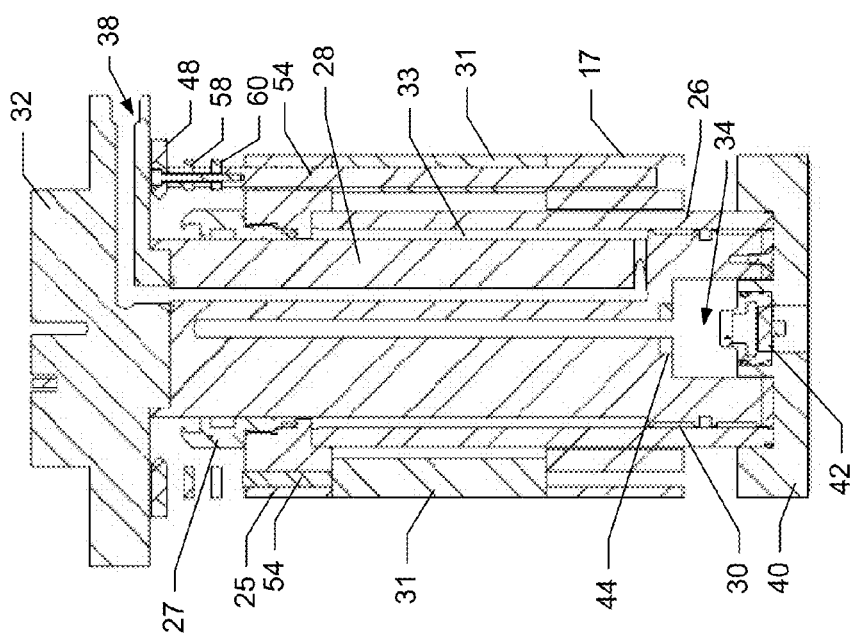
FIG. 8 is a cross-section view of the double-acting hydraulic cylinder assembly of FIG. 6 viewed along line B-B.

As can be understood from FIGS. 7-9, the piston seal 30 divides the interior of the cylinder barrel 26 into an upper chamber 33 and a lower chamber 34, such that the piston rod 28 is located within the upper chamber 33. The cylinder assembly 20 is extended and retracted by the application of pressurized hydraulic fluid, such as hydraulic oil among others, to the lower chamber 34 and/or the upper chamber 33, respectively. As the hydraulic cylinder assembly 20 is a double acting cylinder, each application of the pressurized hydraulic fluid to one chamber (e.g. the upper chamber 33) is accompanied by a loss of hydraulic fluid from the other chamber (e.g. the lower chamber 34). In various embodiments, the insertion and removal of hydraulic fluid from the upper chamber and lower chamber is controlled by one or more valves. The valves may be opened and closed to regulate the flow of hydraulic fluid into and out of the chambers 33 and 34. Alternately, in one embodiment, the valve associated with the upper chamber remains open a majority of the time such that hydraulic fluid can freely enter and exit the upper chamber 33 in response to a load pressure experienced in the lower chamber. For example, the hydraulic fluid in the upper chamber always remains non-pressurized during load carrying, however the valve may be closed for forcibly lowering or retracting the piston rod when gravity alone is insufficient to fully lower the transporter deck 102.

The flange 32 includes at least one extension pressure port 36 and at least one retraction pressure port 38, as shown in FIGS. 2B, 4A-B, 5 and 6. The extension pressure port 36 is in fluid communication with the lower chamber 34, while the retraction pressure port 38 is in fluid communication with the upper chamber 33. To extend the piston rod 28 of the cylinder assembly 20, hydraulic fluid is injected through the extension pressure port 36 into the lower chamber 34 while hydraulic fluid is allowed to drain from the upper chamber 33 through the retraction pressure port 38, thereby causing the piston seal 30 and piston rod to move upward and away from the base cap 40. This in turn causes the flange 32 to extend away from the cylinder housing 24 and the wheel assembly 12. Conversely, to retract the piston rod 28 of the cylinder assembly 20, hydraulic fluid is removed from the lower chamber 34 through the extension pressure port 36 while hydraulic fluid may flow into the upper chamber 33 through the retraction pressure port 38, thereby causing the piston seal 30 and piston rod 28 to move downward towards the base cap 40, which in turn causes the flange 32 to retract towards the cylinder housing 24 and the wheel assembly 12. The retraction of cylinder assembly 20 may also be used to forcibly lower the load deck 102 or to raise a wheel assembly 12 away from the ground. When the load deck 102 is forcibly lowered or a wheel assembly is raised, hydraulic fluid may be forcibly inserted or removed from the upper chamber 33 by a pump.

In various embodiments, the extension and retraction of the cylinder assembly 20 is detected and measured by a height sensor 42, as shown in FIGS. 7-9. In one embodiment, the height sensor 42 is mounted within the cylinder barrel 26 and monitors the position of the piston rod 28 and/or the piston seal 30 relative to default position to determine the height of the portion of the load deck 102 over the axle assembly 10. By way of example and not limitation, the height sensor may be a non-contacting linear sensor, such as the M-series Magnetostrictive Linear-Position Sensor produced by MTS Sensors, a division of the MTS Systems Corporation. Other suitable height sensors include proximity sensors, such as capacitive sensors, non-contacting proximity sensors, such as ultrasonic or inductive sensors, and any other cylinder height sensor.

In one embodiment, the height sensor 42 relies on the Hall effect to determine the vertical motion of a magnet 44 affixed to the piston rod 28. The position of the magnet 44 is used to determine the extension and retraction distances of the piston rod 28. The height sensor 42 generates a height signal that is indicative of the piston rod 28 extension distance or height. The generated height signal is transmitted to the display device 214, wireless controller 206 and/or to an axle assembly control system, such as described below in reference to FIG. 12.

In various embodiments, the cylinder assembly 20 is configured to provide a lift height of zero inches to 12 inches or greater, depending upon the design condition for the particular application. As such, the deck height is monitored and may be controlled automatically by a computer or processing device of the axle assembly control system. In one embodiment, the axle assembly control system receives the height signal from the height sensor 42 and converts the height signal to height data that is useful by one or more control components of the axle assembly control system to make appropriate height adjustments and/or maintain a desired deck height across all or selectively to individual or groups of axle assemblies.

In another embodiment, the deck height is monitored and adjusted automatically based upon the load pressure experienced by one or more pressure sensors or transducers 240. For example, a pressure transducer 240 may be located near axle assembly 10 located at the corners of the transporter deck 102.

Figure 10:
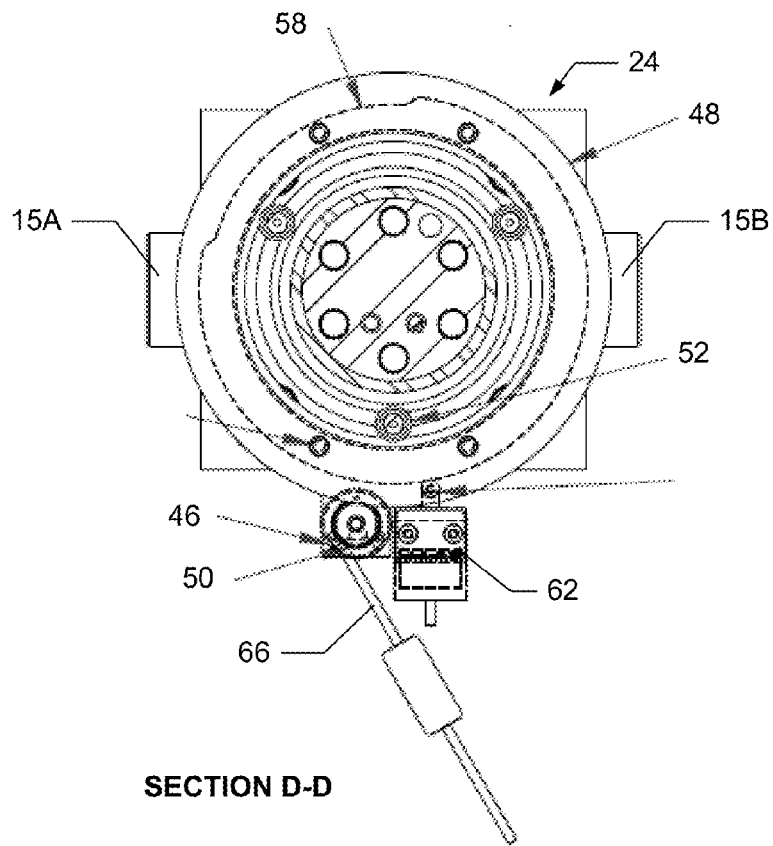
FIG. 10 is a cross-section view of the double-acting hydraulic cylinder assembly of FIG. 5 viewed along line D-D.

In addition to determining the retracted and extension height of the cylinder assembly 20, various portions of the cylinder assembly are used to accommodate, track, and limit the rotation of the wheel assembly 12. Referring now to FIG. 10, the rotation of the wheel assembly 12, which may result from differential steering or any other arrangement, may be measured by a steering sensor 46 rigidly mounted to the flange 32 and in communication with the computer or processing device. It is desirable for the steering sensor 46 to be an encoder and preferably, an absolute encoder that identifies the rotation of the wheel assembly relative to a starting position, as well as, identifying the wheel assembly's rotation to a specific position. The steering sensor 46 measures the rotation of the wheel assembly 12 by measuring the rotation of a steering gear 48 that is engaged to the cylinder housing 24. More particularly, the steering sensor 46 tracks the exact angularity of the wheel assembly 12. In one embodiment, the steering sensor 46 is directly engaged to the steering gear to measure the rotation of the steering gear. In another embodiment, the steering sensor 46 is engaged to the steering gear 48 through a pinion gear 50, wherein the rotation of the steering gear is determined by measuring the rotation of the pinion gear 50.

The steering gear 48 is an annular gear that encircles the cylinder rod 28 and is rotatably engaged to the flange 32 through one or more grooved rollers 52. In one embodiment, the grooved rollers 52 are affixed to a face of the steering gear 48 and engage a projection from a central hub of the flange 32. In another embodiment, the grooved rollers 52 are affixed to the flange 32 and engage the inner surface of the steering gear 48. In either embodiment, the grooved rollers aid to maintain a minimal gap between the flange 32 and the steering gear 48 and allow the steering gear to rotate relative to the flange. The steering gear 48 is further engaged to the cylinder housing 24, consisting of the top plate 25, spacer blocks 31, trunnion yoke 17, and the base cap 40 through one or more of the elongated pins 54. As shown in FIGS. 3B and 4B at least three, and preferably four, elongated pins 54 are used. An upper end of each elongated pin 54 is rigidly affixed to the steering gear 48, while a lower end of each pin 54 is slidably received in the cylinder housing 24 through bushings 56. The rigid engagement between the elongated pins 54 and the steering gear 48 prevents the steering gear from rotating relative to the cylinder housing 24. Conversely, the sliding engagement between the elongated pins 54 and the cylinder housing 24 permits the steering sensor 46 to measure the rotation of the cylinder housing 24 and wheel assembly 12 through the steering gear 48 even when the steering sensor is a variable distance from the cylinder housing due to extension and retraction of the cylinder assembly 20. The position and exact rotation of the cylinder housing 24 and the wheel assembly 12, as measured by the steering sensor 46 is transmitted though one or more leads 66 that are in communication with the computer or processing device.

The rotation of the wheel assembly 12 and the cylinder housing 24 are limited by one or more cam plates 58 and 60 that are also affixed to the elongated pins 54. The cam plates 58 and 60 have profiles that will engage or otherwise trigger one or more limit switches 62 and 64 when the cylinder housing 24 has rotated approximately 200 degrees. In preferred embodiments, the cam plates 58 and 60 limit the rotation of the wheel assembly to approximately 170 degrees. In one embodiment, the first cam plate 58 triggers the first limit switch 62 upon excessive clockwise rotation, while the second cam plate 60 triggers the second limit switch 64 upon excessive counter-clockwise rotation. In other embodiments, a single cam plate and single limit switch may be used to limit rotation of the cylinder housing 24. The limit switches 62 and 64 may be mechanical switches, electrical switches, optical switches, or any other suitable switch. Similarly, the cam plates 58 and 60 may incorporate additional features, including but not limited to electrical leads and optical transmitters or reflectors to trigger a corresponding limit switch 62 and 64, respectively.

Figure 12:
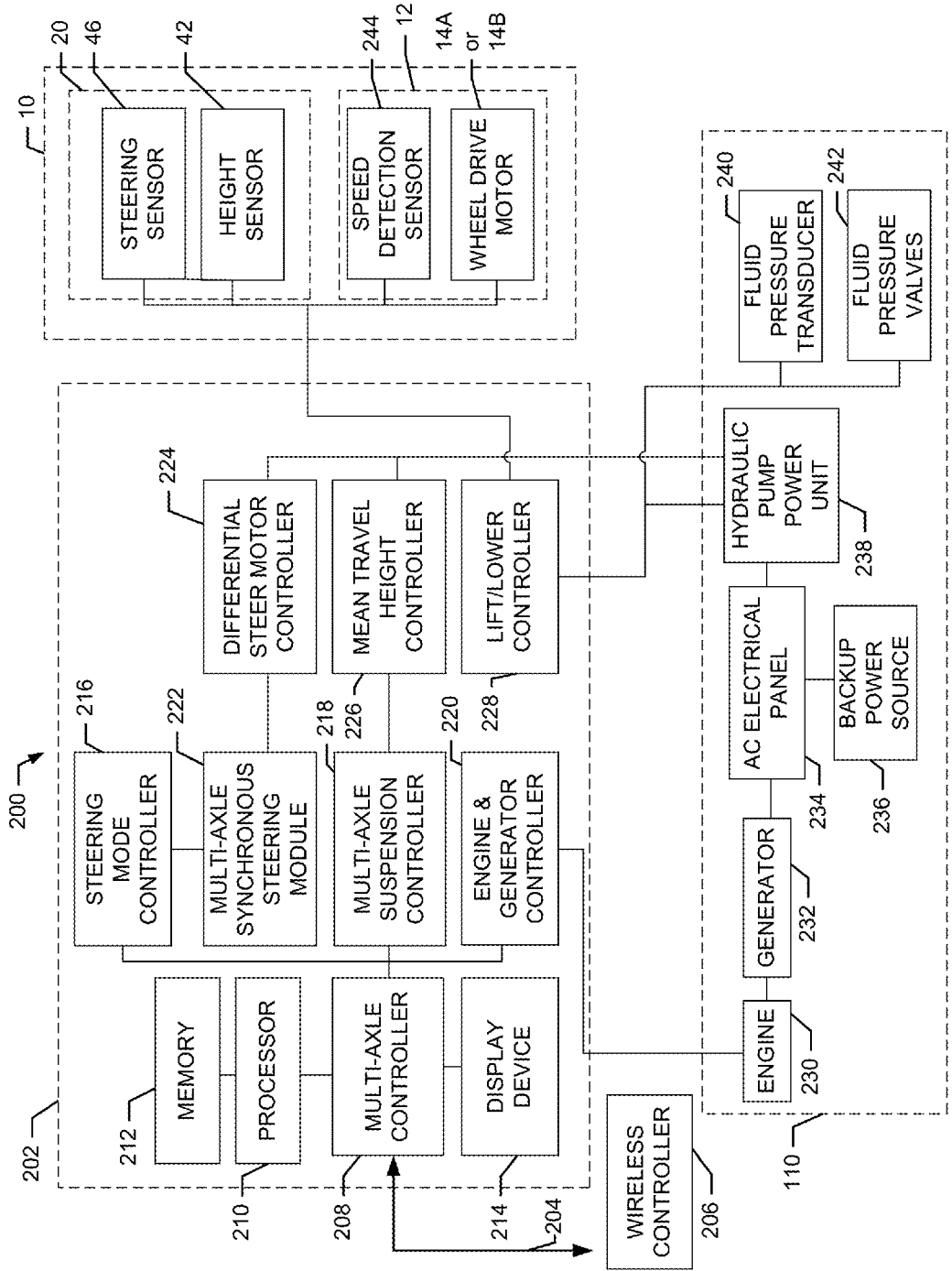
FIG. 12 is a block diagram of an axle assembly control system for controlling the double-acting suspension axle assembly

Referring now to FIG. 12, a block diagram depicts an exemplary axle assembly control system 200 for controlling multiple axle assemblies 10 of a transporter 110. The axle assembly control system 200 includes a computing or processing device 202 that is in communication with the transporter 110 and each zone or group of axle assemblies and/or each individual axle assembly 10. Although various components of the axle assembly control system 200 are illustrated as residing in a particular location, an integration or rearrangement of the various components will not deviate from the spirit of the present disclosure.

The computing or processing device 202 may receive input 204 from an operator 100 using a wireless controller 206. The processing device 202 includes a number of modules and controllers for receiving data, displaying data, and generating commands for controlling the transporter 110 and each axle assembly 10. For example, the input 204 from the operator is received at a multi-axle controller module 208. The multi-axle controller module 208 is in communication with a processor 210 and memory 212 and generates a user interface for display on the display device 214. The display device is any display device, including but not limited to cathode-ray tube displays, liquid crystal displays, light-emitting diode displays, televisions, or other suitable display devices for displaying the user interface. In one embodiment, the display device 214 is incorporated into the processing device 202, while in other embodiments the display device remote from the processing device, but remains in communication therewith through a wired or wireless connection.

The multi-axle controller module 208 also receives data from other controllers and modules. As shown, the multi-axle controller module 208 receives data from a steering mode controller 216, a multi-axle suspension controller 218, and an engine and generator controller 220. The steering mode controller 216 determines whether steering commands are sent to one or multiple axle assemblies 10, the multi-axle suspension controller 218 receives data and transmits commands to extend or retract the cylinder assemblies 20 of each axle assembly, while the engine and generator controller 220 receives data and transmits commands to the on-board power source on the transporter 110.

According to one embodiment, the axle assembly control system 200 controls the operation of wheels 16A and 16B, shown in FIG. 2B, such that each of the wheels 16A and 16B in the wheel assembly 12 may be driven at a speed independent of the speed of the other wheel. For example, wheel 16A may be driven at a higher speed than wheel 16B, such that the wheel assembly, working in conjunction with all of the other axle assemblies 10 will turn towards a common rotational "floating" center point in line with the centerline of wheel 16B, most notably somewhere on an X-axis or Y-axis centerline of the transporter 110. Similarly, wheel 16A may be driven at a lower speed than wheel 16B, such that the wheel assembly 12 will rotate in the opposite direction to align the transporter 110 with common rotational "floating" center point, most notably somewhere opposite on the X-axis or Y-axis centerline of the transporter. In various embodiments, the axle assembly control system can be programmed using one or more steering algorithms to cause the transporter 110 to turn about any point in a plane parallel to the transporter deck 102. In addition, the wheels 16A and 16B may be driven at the same speed for linear, lateral or diagonal travel of the transporter 102.

In another embodiment, the wheels 16A and 16B may be driven by hydraulic motors, which may steer the wheels using a square or splined shaft and slew gear drive arrangement. However, as the motors 14A and 14B are preferably electric drive motors, the speed of each wheel and the travel direction of the wheel assembly 12 may be monitored and controlled using the axle assembly control system.

For example, the steering mode controller 216 transmits data to a multi-synchronous steering module 222 that uses one or more algorithms to determine the particular speeds of rotation for each wheel 16A or 16B of each axle assembly 10 to effectuate the desired steerable direction of the transporter. The multi-synchronous steering module 222 provides the particular speed data to a differential steer motor controller 224 that controls the motors 14A and 14B of each axle assembly 10. Similarly, the multi-axle suspension controller 218 transmits data to a mean travel height controller 226 that transmits commands to each cylinder assemblies 20 to set the mean height of the deck 102 for the transporter 110.

The engine and generator controller 220 receives data and transmits commands to the engine 230 and/or generator 232 of the transporter 110. In one embodiment, the generator 232 provides alternating current (AC) power to an electrical panel 234. As shown, the electrical panel 234 may also be in electrical communication with a backup or alternate power supply 236, such as a battery, that supplies direct current (DC) power. The electrical panel 234 is also in electrical communication with a hydraulic pump power unit 238.

The hydraulic pump power unit 238 powers and controls the flow of hydraulic fluid to the various axle assemblies 10. The hydraulic pump power unit 238 is also in communication with the differential steer motor controller 224, the mean travel height controller 226, and a lift/lower controller 228 that determines the how the hydraulic fluid is to be applied to each cylinder assembly 20 of each axle assembly 10. Some of the data received at the differential steer motor controller 224, the mean travel height controller 226, a lift/lower controller 228, and hydraulic power unit 238 is generated by one or more sensors, valves, transducers, encoders, and/or motors at the axle assembly or various locations on the transporter 110.

In one embodiment, the axle assembly control system is configured to monitor the pressure in each axle assembly 10 or groups of axle assemblies as the wheels 16A and 16B pass over undulations in the ground or other operating surface 300. In response to changes in the ground or operating surface elevation, the axle assembly control system increases or decreases the hydraulic fluid pressure in the lower chamber 34 of the corresponding axle assembly to maintain the assigned or allowable loading on each assembly. Alternately, the axle assembly control system can increase or decrease the oil pressure plumbed to the groups of axle assemblies. In all embodiments, relatively accurate load data may be provided to the operator 100, and the axle assembly control system may return each axle assembly 10 to a default height if an excessive load is engaged or if the load's center-of-gravity is not positioned within tolerable limits.

By way of example and not limitation, feedback data regarding the hydraulic pressure and fluid in the cylinder assembly 20 may be generated by the fluid pressure transducer 240 or one or more fluid pressure valves 242 in communication with the upper chamber 33 and/or the lower chamber 34 of the cylinder barrel 26. In one embodiment, the hydraulic fluid pressure is monitored only in the lower chamber 34, as the upper chamber 33 normally remains unpressurized except when lifting the weight of a wheel assembly 12 to repair a defective axle assembly 10 or to forcibly lower the deck 102.

Further, the feedback data is received at the processing device 202 from the steering sensor 46 and the height sensor 42. The processing device 202 also receives feedback data from a speed detection sensor 244 incorporated into the wheel assembly 12 to measure the actual speed of each wheel 16A and 16B and from each of the motors 14A and 14B.

For example, in the event of a motor failure or tire failure, the operator 100 can use the display device 214 to communicate with the axle assembly control system 200 to "disable" or selectively choose to remove the load from any axle assembly 10 and retract the tires from surface engagement. The operator 100 can then use display device 214 to selectively retract one or more of the desired wheel assemblies 12A-D, thereby distributing the load to the remaining axles and perform maintenance or other repairs, as necessary, on the refracted wheel assembly without requiring the transported load to be lowered.

The wireless controller 206 is configured to communicate with the axle assembly control system 200 via a wireless communication link. In one example, a wireless transmitter (not shown) is connected to the wireless controller 206 via a communication port (not shown). The wireless transmitter transmits control signals to control differential steering, and lift or lower a transport deck. A wireless transceiver (not shown) is connected to the transporter control system 200 and receives the control signal from the wireless controller 206. The transmitter and corresponding receiver may utilize a Gigabit Ethernet link, IEEE 802.11 link, Ultra-Wide Band (UWB) link, or any other suitable wireless communication link.

The continuous monitoring of the load pressure placed on each axle assembly 10 or pairs thereof, coupled with the lateral articulation of each wheel assembly 12 allows the transporter 110 to conform to surface irregularities through the engagement to trunnion pegs 15A and 15B, which assures that no drive wheel 16A or 16B takes on more than its assigned load under any condition. In addition, the axle assembly control system 200 and the double acting suspension also enables selectively lifting or retracting one or more of the wheel assemblies 12 away from the ground and towards the deck 102. For example, if a flat tire or damaged tire is observed on one or more of the wheel 16A, 16B.

While the height of the load deck 102 may be set to a mean level during operation, the load pressure on the axles assemblies 10 and an equalizing suspension pressure provided by the insertion or removal of hydraulic fluid from the axle assemblies may be monitored to control the alignment of the load in planes along the X-axis and Y-axis of the load deck. By way of example and not limitation, the axle assemblies 10 may be grouped for monitoring and sharing hydraulic pressure. The axle assemblies may be grouped in pairs or in larger groups effectively forming three-point or four-point suspensions. A greater number of suspension zones may also be used.

Figure 13:
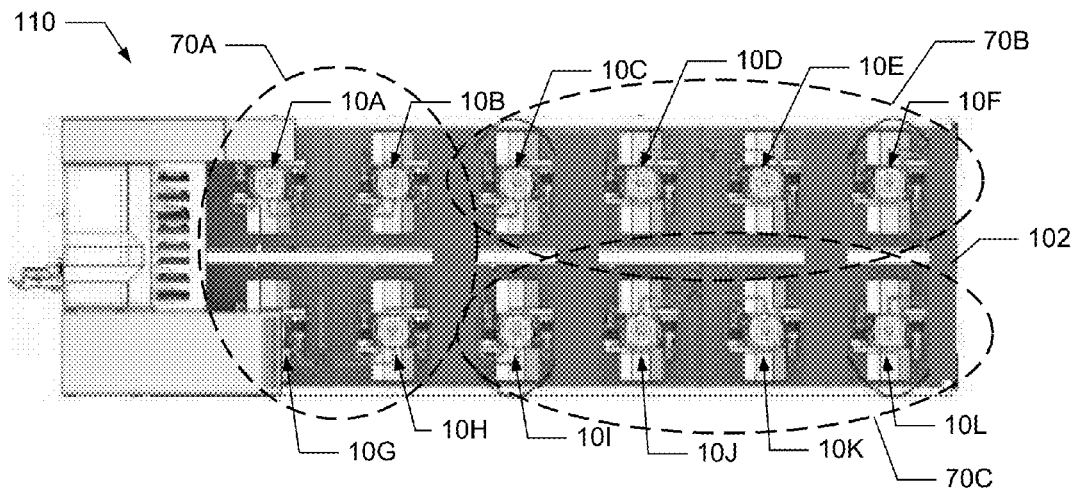
FIG. 13 is a sectional plan view of the axle positions on the underside of a transporter as viewed from above.
Figure 14:
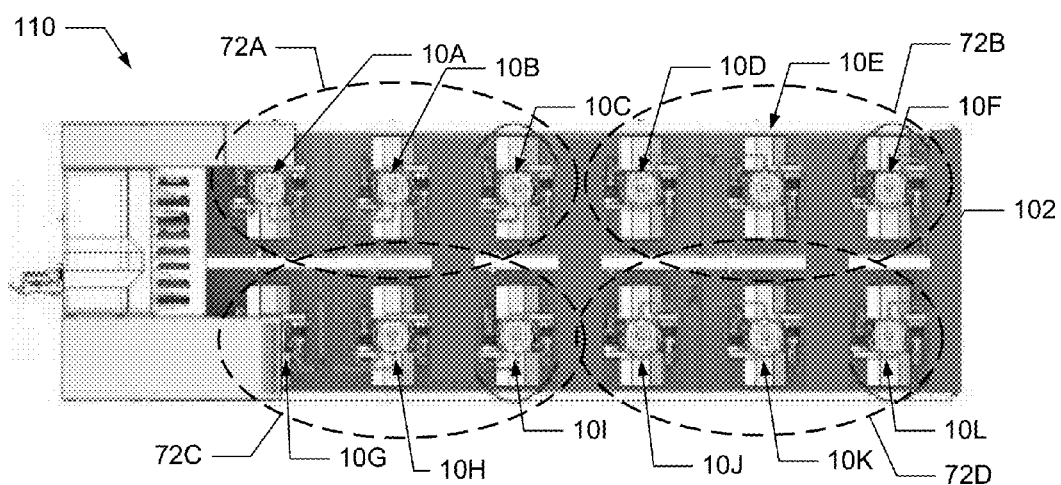
FIG. 14 is a sectional plan view of the grouped axles on the underside of a transporter as viewed from above.
Figure 15:
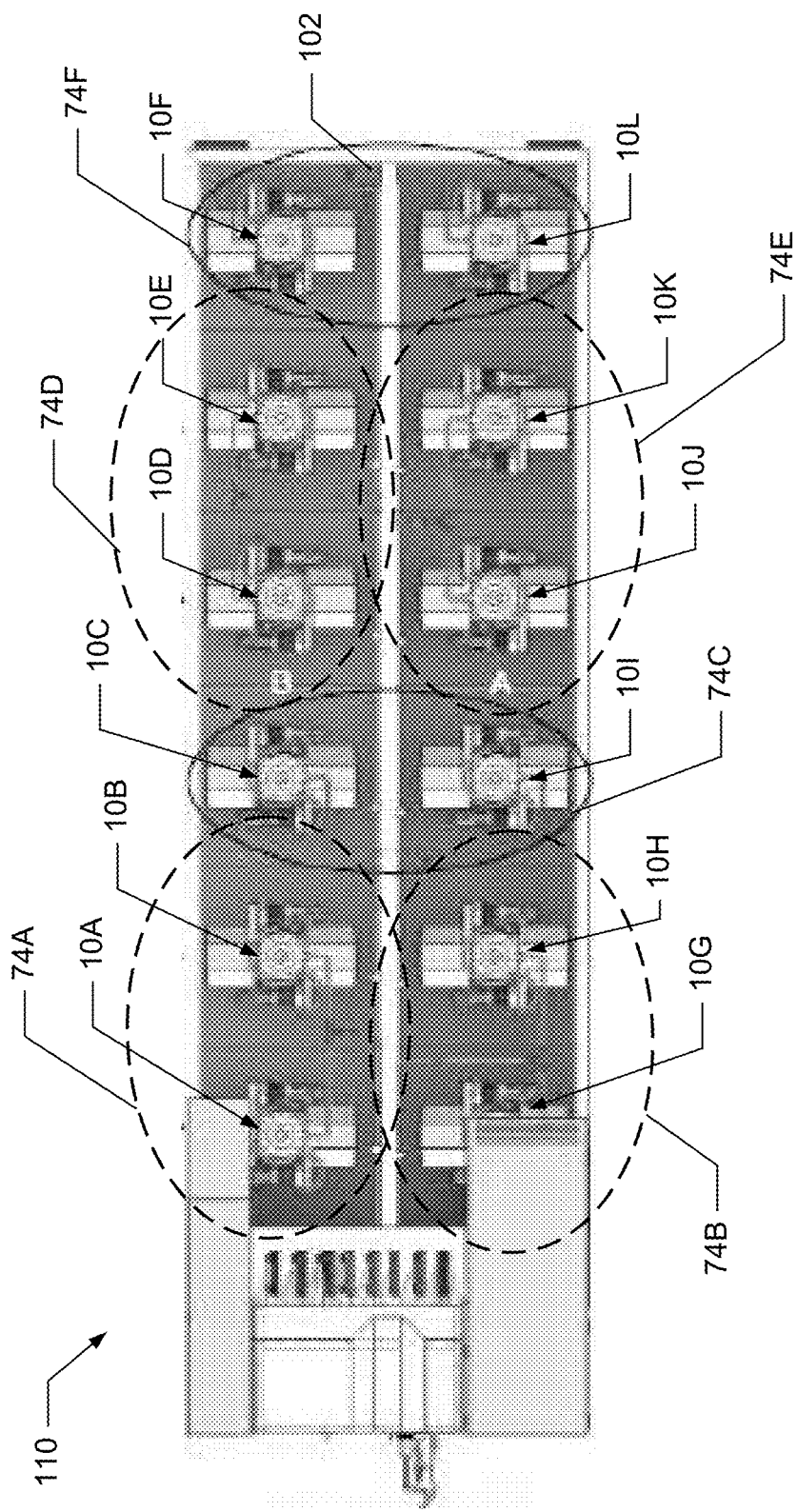
FIG. 15 is a sectional plan view of the grouped axles on the underside of a transporter as viewed from above.

As shown in FIGS. 13-15, the axle assemblies 10A-L may be arranged in zoned groups 70A-C, 72A-D, or 74A-F, wherein axle assemblies within each group, such as shown in groups 70A-C can share hydraulic fluid for load equalization. As shown in FIG. 13, the three groups 70A-C form a three-point equalizing suspension, while the groups 72A-D of FIG. 14 for a four-point suspension. Other configurations, including the six-point suspension formed by groups 74A-F, as shown in FIG. 15 may be used.

In operation, the fluid exchange between adjacent axle assemblies 10A-L or even adjacent groups, such as 70A-C, provides additional suspension-equalizing attributes that are desirable when moving massive loads over uneven surfaces. Further all or some of the groups 70A-C, 72A-D, or 74A-F, can be individually pressure monitored for uniform load equalization over undulating surfaces. Individual monitoring sensors, including but not limited to the pressure transducer 240 and the height sensor 42 allow for determining the relative desired height of the axle assemblies 10A-L or groups 70A-C, 72A-D, or 74A-F.

For example, data from one or more pressure sensors or transducers 240, as shown in FIG. 12, within each axle assembly 10 or group of axle assemblies 70A-C, 72A-D, and 74A-F, may be used to identify and display where the center of gravity of a particular load 104 is in relation to the center of the zone groups. With precise zone monitoring, the operator 100 has the capability to control yaw, pitch and roll of the load 104 or other objects during precision mating operation, such as during a "docking" procedure where transported objects are brought together during assembly operations.

Moreover, the axle assembly control system provides precision control for the deck height of the transporter 110. In one embodiment, the computerized control system is in communication with a pressure transducers 240 to provide accurate elevation data and control the extension of each axle assembly 10 located at the corners of the transporter 110. In another embodiment, each pair of axle assemblies 10A-B, 10C-I, 10D-E, 10E-L, 10J-K, and 10G-H includes a pressure transducer.

Figure 16A:
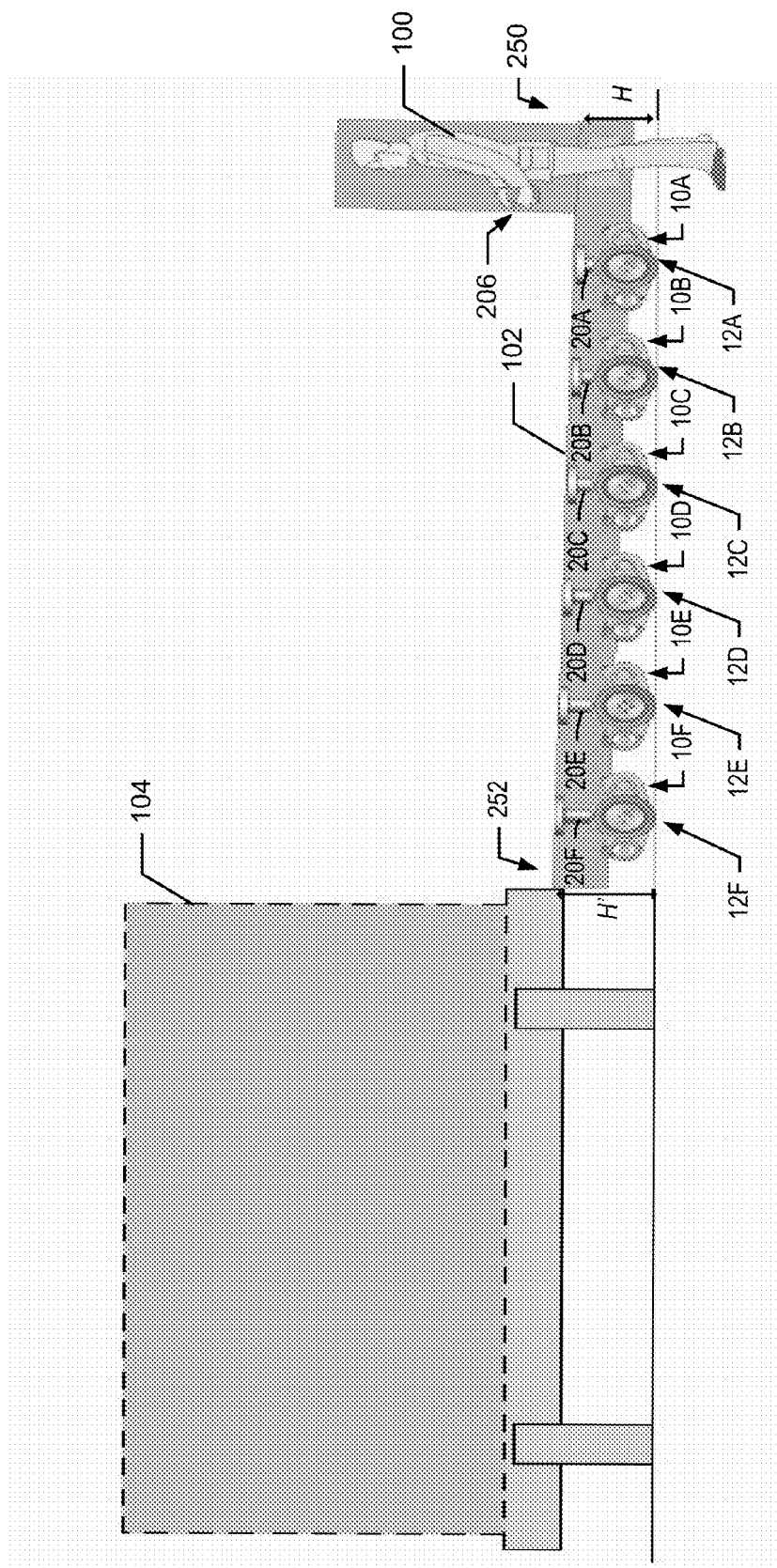
FIG. 16A is a side elevation of a headed transporter partially lowered only by gravity.
Figure 16B:
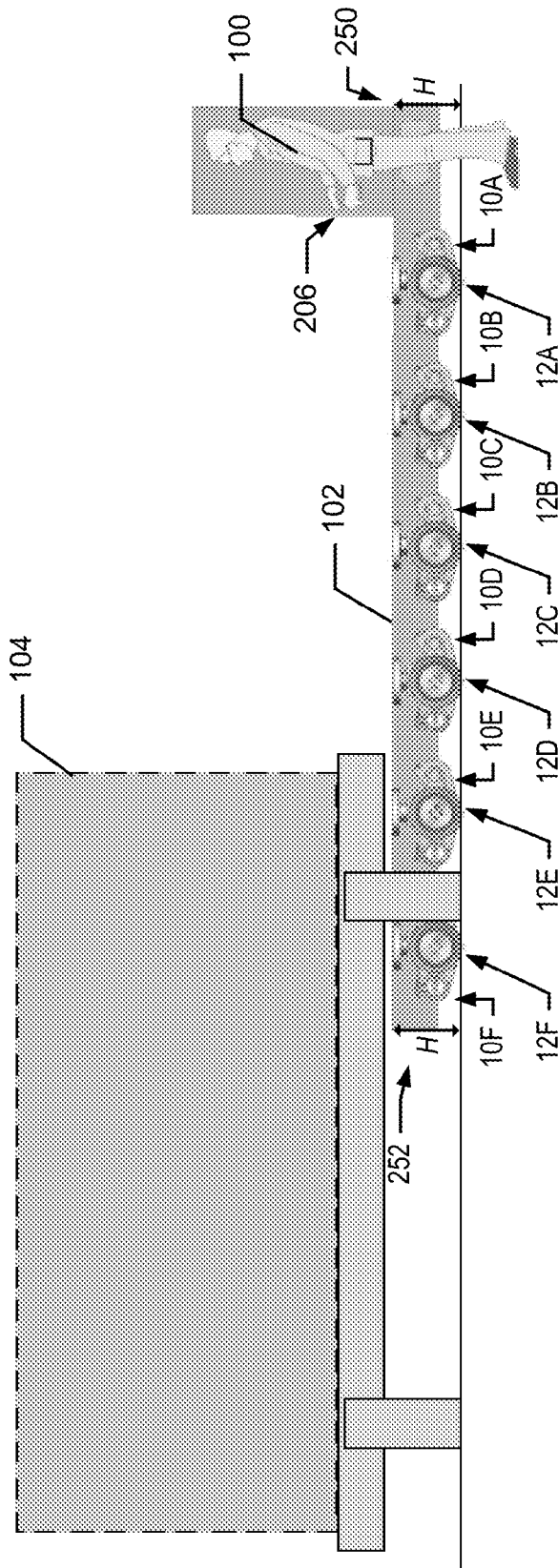
FIG. 16B is a side elevation of a headed transporter uniformly lowered by forced lowering.
Figure 17:
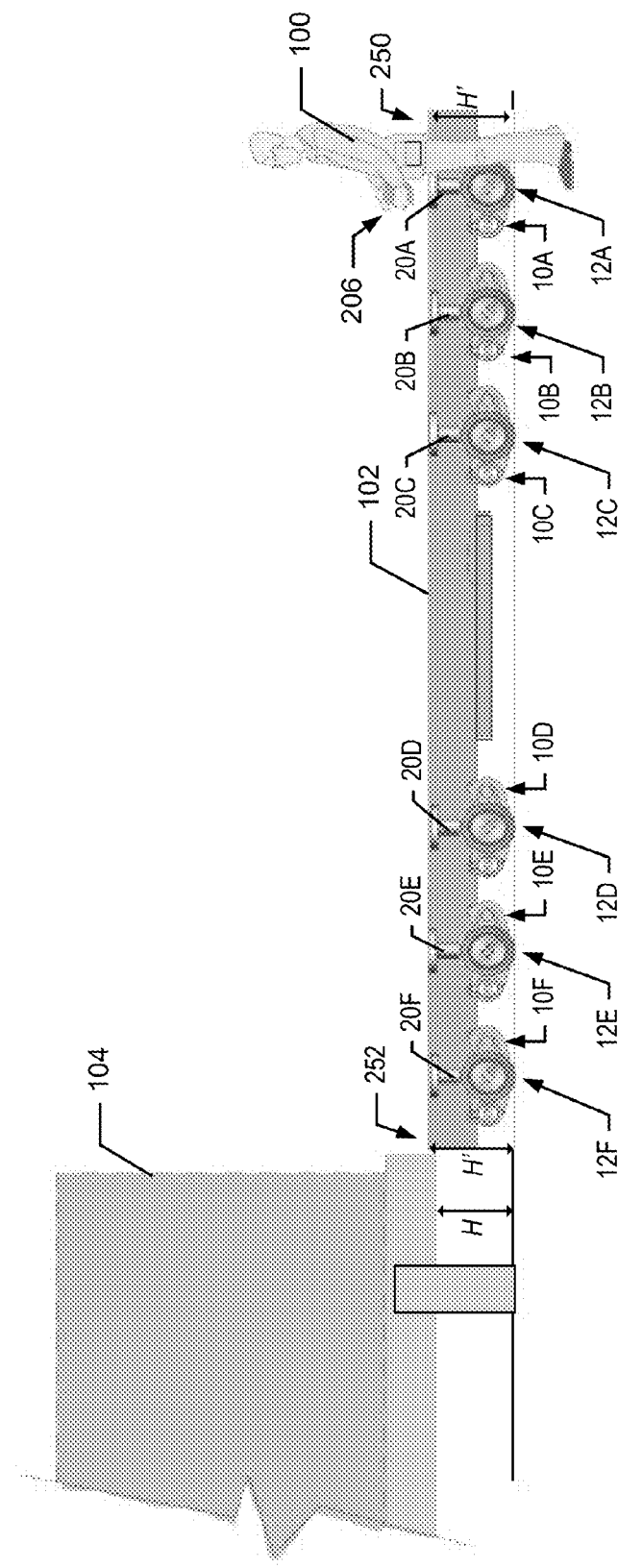
FIG. 17 is a side elevation of a "headless" transporter partially lowered at both front and rear end of the load deck only by gravity.

FIGS. 16A and 17 depict side elevation views of a load deck 102 being supported by multiple axle assemblies 10 after an attempt to lower the deck solely based on the influence of gravity. FIG. 16A depicts a "headed" transporter, while FIG. 17 depicts "headless" transporter. As discussed above, when the extension and retraction of cylinder assembly 20 is solely gravity dependant, the release of pressurized fluid allows the transporter's load deck 102 to lower and the transporter to exit from under a stand or pallet supported load. However, as illustrated in FIG. 16A, there are instances where gravity is not sufficient to lower the deck in a uniform manner (e.g., substantially level). For example, if the machinery portion of the transporter is located at the back end 250 of the load deck 102, the additional weight of the machinery at the back end may cause this portion of the load deck to lower to a nominal height H faster than a front end 252 which may remain at some other height H' that is greater than H. Moreover, as relief valves open to relieve the hydraulic pressure, there may be sufficient resistance in the long fluid lines leading to the hydraulic fluid reservoir and mechanical friction in the hydraulic cylinders that the front end 252 may react slowly or not fully lower to the height H, thereby preventing unrestricted exit from under the load, or entry under the next load to be transported. FIG. 16B depicts the transporter of FIG. 16A, after the load deck 102 has been forcibly lowered.

FIG. 17 depicts a side view of the load deck 102 being supported by multiple axle assemblies 10 after selectively controlling the cylinder assembly 20 of one or more axle assemblies 10. According to one aspect, the operator 100 interacts directly with the control system 200 to generate a control signal to, for example, fully retract the cylinder assembly 20 such the load deck 102 is in a load position or unload position. According to another aspect, the operator 100 interacts with the control system 200 via the wireless controller 206 to generate the control signal. The control system 200 also monitors the height of the front and back of the transporter assembly 252 and 250, respectively, through height sensors which generate signals indicative of the height for selected axle assemblies 10A-F. The control system 200 processes the height signal to determine whether to continue supplying pressure to force the lowering or retraction of the axle assembly 10. The processing may include, for example, comparing a sensed height or load height, as determined by the pressure load at the axle assemblies 10 with a desired transport height stored in a memory of the controls system or received as input from the operator 100 at the control system. If the sensed height is greater than the desired height, the control system will continue to supply pressure to lower the axle assembly 10. In contrast, if the sensed height is equal to the desired height, the control system will not continue to supply pressure to lower the axle assembly 10. According to another embodiment, when not engaged to a platform load, the control system 200 may simply apply a downward force to all of the axle assembly 10 simultaneously in advance of any insertion and removal. As there is no load there is no need for monitoring and equalizing the suspension of individual axle assembles 10. An insertion and/or removal configuration may be selected as a mode of operation by the operator 100.

As can be seen in FIG. 17, the control system 200 enables the operator 100 to selectively control the height of the axle assemblies 10A-F such that the deck 102 is lowered in a uniform manner. Stated differently, the back end 250 and the front end 252 are both lowered such that that height of the deck at the back end 250 is substantially equal to the height of the deck at the front end 252.

In response, the control system 200 may automatically, or at the direction of the operator 100, lower the particular axle assemblies 10E-F by injecting hydraulic fluid into the upper chamber 33 of each cylinder; thereby forcing the load deck 102 to lower to height H' from to H.

Referring back to FIGS. 12-15, the computerized control system 200 may be located on the transporter 110 and may be accessed and controlled wirelessly from anywhere on the transporter 110 or remotely away from the transporter, which allows an operator 100 to remain a safe distance away from any hazardous materials that may be transported by the transporter 110. The load distribution for each axle pair or group zones 70A-C, 72A-D, or 74A-F may be transmitted to the computerized control system through wired or wireless transmissions. The load information may be displayed on a display device 214 for the operator 100 to identify the weight of the load and the position of the load's center-of-gravity. The computerized control system allows the operator 100 to control the lift height, as well as the yaw, pitch, and roll of a load on the transporter 110.

In addition, the cylinder assemblies 20A-L may be used to lift one or more of the wheel assemblies 12A-L off the ground and retract it towards the deck 102. For example, in the event of a motor failure or tire failure, the operator 100 can "disable" any axle assembly 10 using the computerized control system 200. The operator 100 can then retract one or more of the desired wheel assemblies 12A-L, thereby distributing the load to the remaining axles to complete a possibly critical move sequence and/or perform maintenance or other repairs, as necessary on the refracted wheel assembly without necessarily requiring the transported load to be lowered.

The computerized control system 200 and the double acting suspension arrangement allows for lifting of individual axle assemblies 10 to eliminate dragging a none-functioning axle assembly in event that it has to be "disabled" when completing a critical move sequence. The continuous monitoring of the load placed on each axle assembly 10A-L or groups thereof, coupled with the lateral articulation of each wheel assembly 12A-L to conform to any surface irregularities through the engagement to each pair of trunnion pegs 15A and 15B, which assures that no wheel 16A or 16B takes on more than its assigned load under any condition.

All directional references (e.g., proximal, distal, upper, lower, upward, downward, left, right, lateral, front, back, top, bottom, above, below, vertical, horizontal, clockwise, counterclockwise, omni directional) are only used for identification purposes to aid the reader's understanding of the present invention, and do not create limitations, particularly as to the position, orientation, or use of the invention. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order, and relative sizes reflected in the drawings attached hereto may vary.

The above specification and examples provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

What is claimed is:

1. An axle assembly for a transporter comprising:
   a double-acting hydraulic cylinder assembly comprising a cylinder housing defining at least one trunnion peg and an opening to receive a cylinder barrel, the cylinder barrel containing a piston seal to divide the cylinder barrel into an upper chamber and a lower chamber, wherein the piston seal is engaged to a piston rod within the upper chamber, the piston rod further engaged to a flange, wherein the flange is configured to engage a deck of the transporter;
   a wheel assembly comprising a frame to engage the at least one trunnion peg, a first wheel, a second wheel, a first drive motor operatively engaged to the first wheel, and a second drive motor operatively engaged to the second wheel, the wheel assembly configured to rotate about a central longitudinal axis of the cylinder barrel, wherein the first motor operates independently of the second motor to rotate the wheel assembly though a differential steering arrangement;
   at least one cam plate rigidly affixed to at least one elongated pin engaged to the lower axle frame, the at least one cam plate having a profile to engage an at least one wheel assembly rotation limit switch;
   a height sensor affixed to a bottom of the cylinder housing, the height sensor in communication with the cylinder barrel to measure an extension distance of the piston rod; and
   at least one controllable valve in communication separately with the upper chamber and the lower chamber of the cylinder barrel, wherein the at least one controllable valve is actuated in response to a received control signal to pressurize the lower chamber for extending the piston rod and to pressurize the upper chamber for forcibly lowering the piston rod under a no-load condition.

2. The axle assembly of claim 1, wherein the first and second drive motors are electric drive motors.

3. The axle assembly of claim 1, wherein the height sensor is a non-contacting linear transducer.

4. The axle assembly of claim 1, wherein the wheel assembly rotates about a central axis of the double-acting hydraulic cylinder assembly and is limited to 220 degrees.

5. The axle assembly of claim 1, wherein the wheel assembly rotates about a central axis of the double-acting hydraulic cylinder assembly 180 degrees to accommodate all-directional steering.

6. The axle assembly of claim 1, wherein the double-acting hydraulic cylinder assembly has a lift stroke of zero up to twelve inches or greater.

7. The axle assembly of claim 1 where the height sensor measures an extension height of the double acting hydraulic cylinder.

8. The axle assembly of claim 1 comprising at least one steering sensor that measures a rotation angle of the double acting hydraulic cylinder.

9. The axle assembly of claim 1, where the axle assembly is in communication with a control system comprising at least one processor to:
- receive an input comprising desired height data;
- receive the height signal from the height sensor;
- compare the current height data to the desired height data to identify an adjustment height; and
- generate the control signal to adjust the extension distance of the piston rod by the identified adjustment height.

10. The system of claim 9, wherein the control system monitors the pressure load at the double-acting hydraulic cylinder assembly.

\* \* \* \* \*